(12) United States Patent
Richter et al.

(10) Patent No.: US 11,268,649 B2
(45) Date of Patent: Mar. 8, 2022

(54) JAW GRIP MOUNT FOR SMARTPHONES OR TABLETS WITH THEFT PROTECTION

(71) Applicant: WANZL GMBH & CO. KGAA, Leipheim (DE)

(72) Inventors: Harald Richter, Engelsbrand (DE); Johann Daminger, Neu-Ulm (DE); Paul Ruf, Eppishausen (DE); Robin Oechsle, Ulm (DE)

(73) Assignee: WANZL GMBH & CO. KGAA, Leipheim (DE)

( * ) Notice: Subject to any disclaimer, the term of this patent is extended or adjusted under 35 U.S.C. 154(b) by 73 days.

(21) Appl. No.: 16/754,682

(22) PCT Filed: Feb. 21, 2019

(86) PCT No.: PCT/EP2019/054325
§ 371 (c)(1),
(2) Date: Apr. 8, 2020

(87) PCT Pub. No.: WO2019/162384
PCT Pub. Date: Aug. 29, 2019

(65) Prior Publication Data
US 2020/0300406 A1    Sep. 24, 2020

(30) Foreign Application Priority Data
Feb. 21, 2018 (DE) ...................... 20 2018 000 931.8

(51) Int. Cl.
*F16M 11/04* (2006.01)
*B62B 3/14* (2006.01)
(Continued)

(52) U.S. Cl.
CPC ......... *F16M 11/041* (2013.01); *B62B 3/1424* (2013.01); *F16M 13/02* (2013.01);
(Continued)

(58) Field of Classification Search
CPC .. F16M 11/041; F16M 13/02; F16M 2200/02; B62B 3/1424; G06F 1/1632; H04M 1/04
See application file for complete search history.

(56) References Cited

U.S. PATENT DOCUMENTS 3,611,761 A * 10/1971 Atkinson ............ E05B 37/0096
70/129
8,047,032 B1 * 11/2011 Liu ........................ E05B 37/10
70/303 A
(Continued)

FOREIGN PATENT DOCUMENTS

| JP | 3102032 U | * | 6/2004 | | |
| WO | WO-2014083024 A2 | * | 6/2014 | ........... | F16M 11/041 |
| WO | WO-2017076666 A2 | * | 5/2017 | ........... | B62B 5/0096 |

OTHER PUBLICATIONS

Grifiti Nootle Clamp and Universal Phone Mount sold on amazon, first available date: Dec. 3, 2015 web link: https://www.amazon.com/GRIFITI-Universal-Adjustable-Smartphones-Handlebars/dp/B018WKJZWS (Year: 2015).*
(Continued)

*Primary Examiner* — Terrell L McKinnon
*Assistant Examiner* — Ding Y Tan
(74) *Attorney, Agent, or Firm* — McCoy Russell LLP

(57) ABSTRACT

The invention relates to a jaw grip mount equipped with theft protection for smartphones or tablets comprising: a body which forms a support surface for the smartphone or tablet; two jaws designed to grip the smartphone or tablet at two opposite edge regions and to receive the edge region in an interlocking manner, at least one jaw movable between an open position and a variable locking position and can be locked in the locking position; and a release button for unlocking the lock on the moving jaw in the closed position thereof. The invention further provides at least one actuating mechanism which can be moved between a plurality of
(Continued)

defined and marked positions and which includes a key element which can interact only in a specific position with a complementary key element of the release button so that it is only possible to actuate the release button in this position.

12 Claims, 13 Drawing Sheets

(51) Int. Cl.
  *F16M 13/02* (2006.01)
  *G06F 1/16* (2006.01)
  *H04M 1/04* (2006.01)
(52) U.S. Cl.
  CPC ............ *G06F 1/1632* (2013.01); *H04M 1/04* (2013.01); *F16M 2200/02* (2013.01)

(56) References Cited

U.S. PATENT DOCUMENTS

| | | | | |
|---|---|---|---|---|
| 2013/0148273 | A1* | 6/2013 | Tsai | H04M 1/04 361/679.01 |
| 2014/0069973 | A1* | 3/2014 | Peck | B60R 11/02 224/411 |
| 2015/0288406 | A1* | 10/2015 | Haymond | A45C 13/30 455/575.6 |

OTHER PUBLICATIONS

ISA European Patent Office, International Search Report Issued in Application No. PCT/EP2019/054325, dated May 15, 2019, WIPO, 2 pages.

* cited by examiner

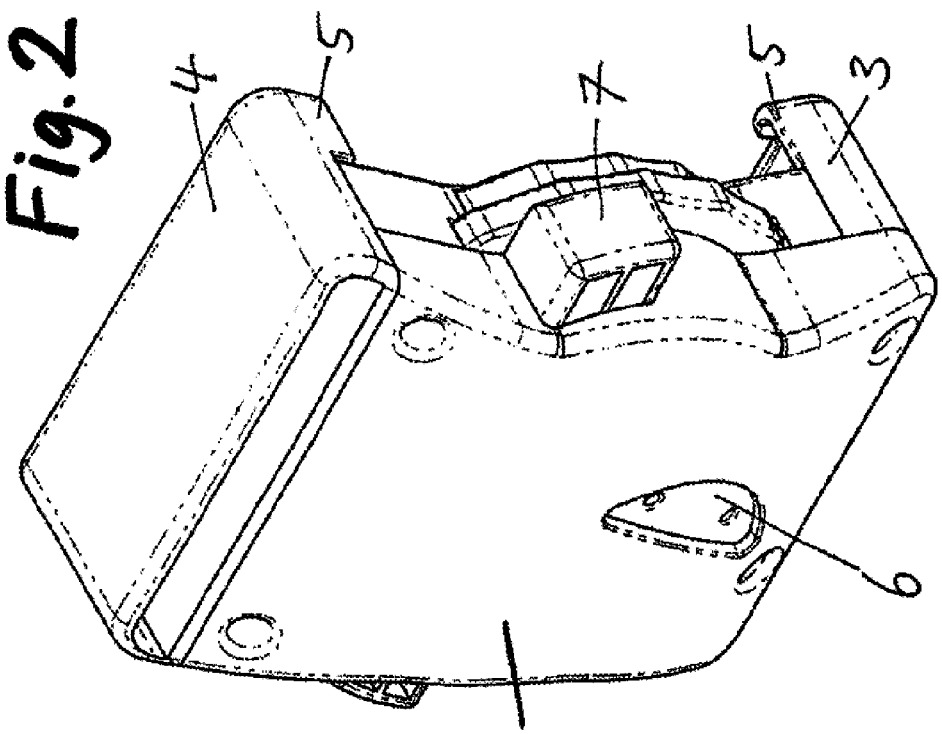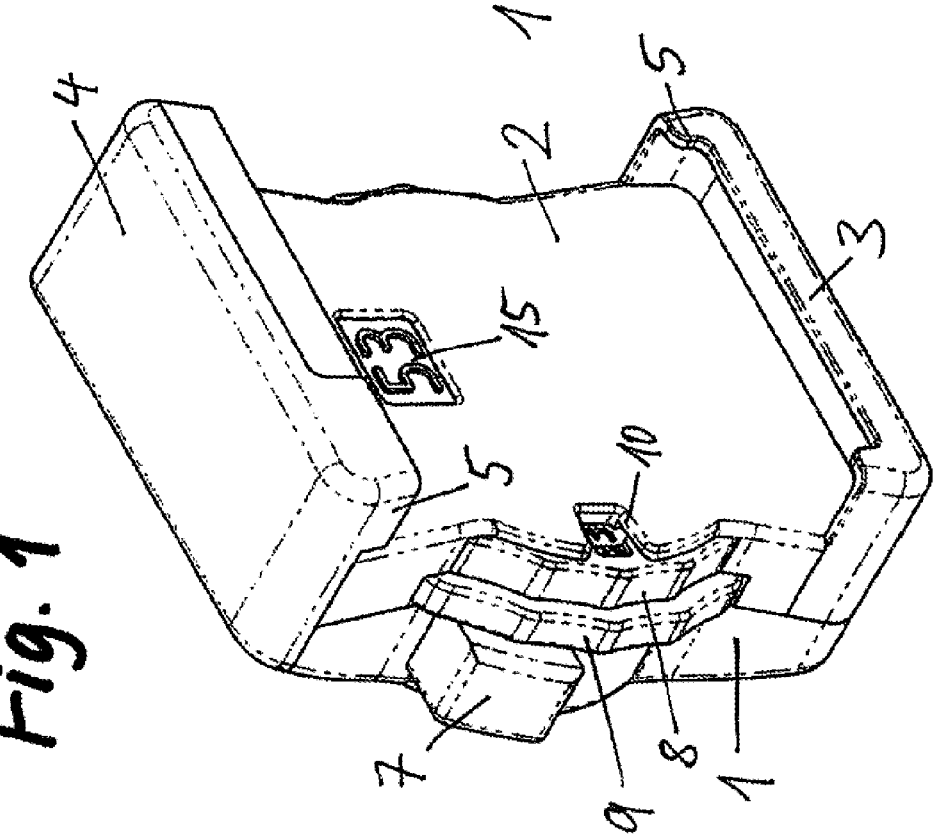

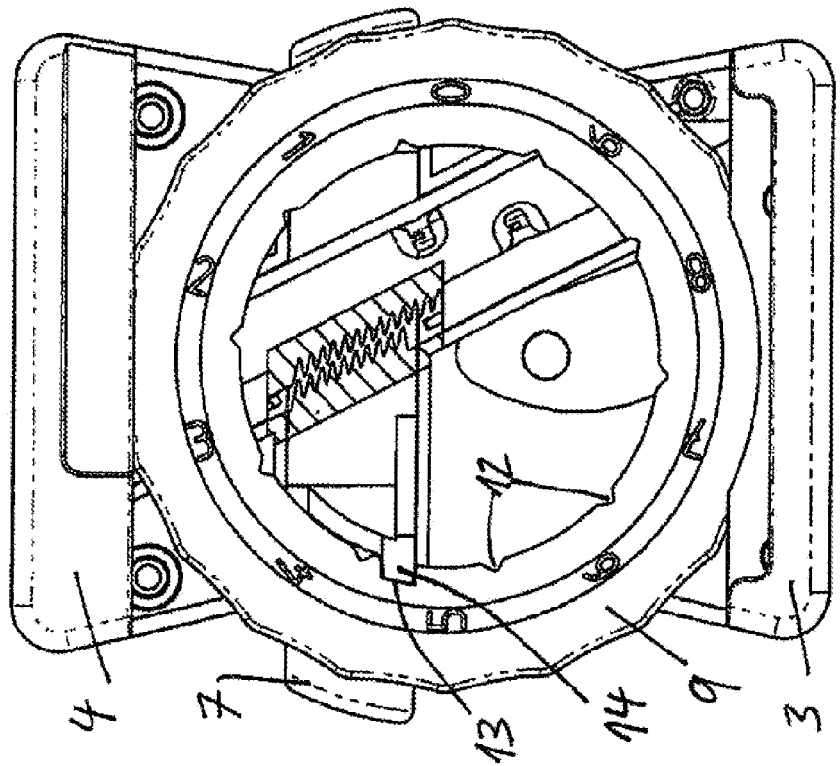
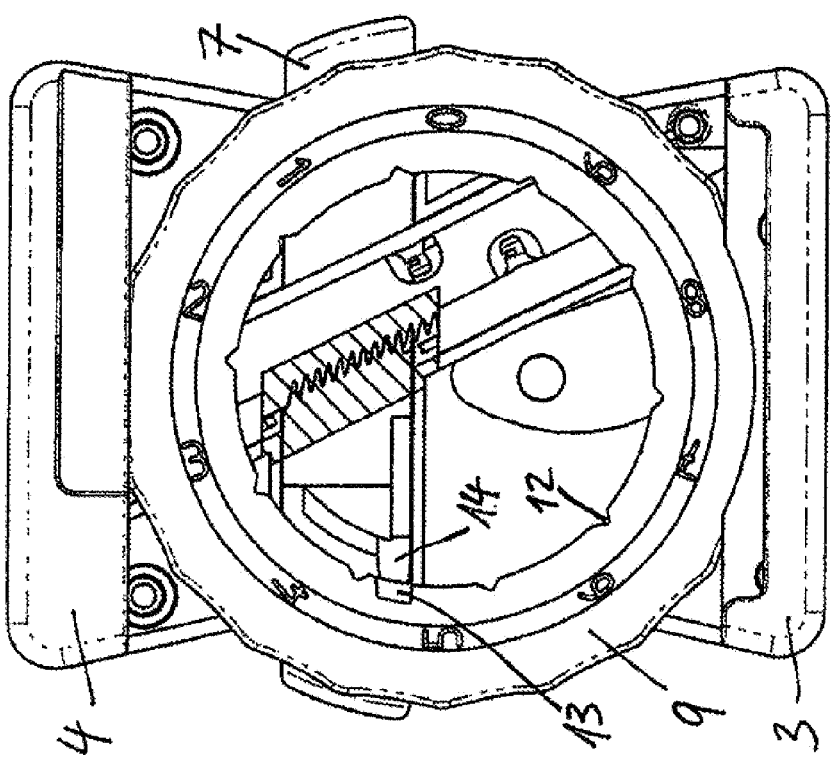

JAW GRIP MOUNT FOR SMARTPHONES OR TABLETS WITH THEFT PROTECTION

CROSS-REFERENCE TO RELATED APPLICATIONS

The present application is a U.S. National Phase of International Patent Application Serial No. PCT/EP2019/054325 entitled "JAW GRIP MOUNT FOR SMARTPHONES OR TABLETS WITH THEFT PROTECTION," filed on Feb. 21, 2019. International Patent Application Serial No. PCT/EP2019/054325 claims priority to German Patent Application No. 20 2018 000 931.8 filed on Feb. 21, 2018. The entire contents of each of the above-referenced applications are hereby incorporated by reference for all purposes.

TECHNICAL FIELD

The invention relates to a clamping jaw holder for smartphones or tablets, having anti-theft protection means.

BACKGROUND AND SUMMARY

Mounts, configured as clamping jaw holders, for smartphones or tablets are known as universal mounts. They hold the smartphone or tablet between two jaws which can be moved relative to one another with a relatively large adjustment travel, which engage either on the two side edges or on the upper and the lower edge of the smartphone or tablet, and which are suitable for accommodating smartphones or tablets of various sizes on account of the jaw adjustment travel.

In the case of such clamping jaw holders, at least one of the two jaws can be moved, and a mechanism is provided for this purpose which preloads the movable jaw into an open position by way of spring force and, when a device is inserted, makes it possible to close the jaw, by applying pressure counter to the spring force, until it bears against the device, with a ratchet mechanism blocking the return to the open position. A release button can unlock the ratchet mechanism in order to allow the at least one movable jaw to return to the open position thereof.

In the case of conventional clamping jaw holders, anyone can therefore readily remove the device from the clamping jaw holder straightaway by simply actuating the release button, and then the clamping jaw holder opens.

It is the object of the invention to provide a clamping jaw holder for smartphones or tablets, which is equipped with an anti-theft protection means so that a device held therein cannot be readily taken away by someone.

The invention makes it possible, in particular, to equip shopping carts in supermarkets or hardware stores with holders for smartphones or tablets, into which customers can insert their smartphone or tablet while shopping in order to display shopping lists, material lists, lists of dimensions or the like and thus make shopping easier. In this case, the possibility of an interactive advertising and advisory function, as is already practiced at some points of sale, where advertising messages, search help, product-specific advice and information and the like can be communicated, via smartphone or tablet, from the point of sale to the smartphone or tablet, also plays a role, which is why a mount on the shopping cart is particularly expedient, so that the customer can always keep an eye on the smartphone or tablet while shopping and can keep their hands free in the process. However, for such an application, it is important to provide a theft prevention means which at least suffices for preventing a rapid removal of the device in an unobserved moment if the customer is currently occupied with goods on a shelf.

Said object is achieved according to the invention by way of the arrangement specified in claim 1. The dependent claims provide advantageous refinements of the invention.

To this end, the clamping jaw holder according to the invention is equipped with a combination locking mechanism, as is known, in principle, from combination locks, which locks the release button and releases the latter, and makes actuation thereof possible, only when the correct combination has been input.

BRIEF DESCRIPTION OF THE FIGURES

The invention will be described in more detail below on the basis of an exemplary embodiment with reference to the attached drawings, in which:

FIG. 1 shows a perspective view of a holder according to the invention, obliquely from the front, FIG. 2 shows a perspective view of the holder according to FIG. 1, obliquely from the rear, FIG. 6 shows a cut-open front view of the holder with locking slide located in the locking position, FIG. 7 shows a view similar to FIG. 6, with locking slide located in the release position.

FIGS. 1 and 2 show perspective views, obliquely from the front and obliquely from the rear, respectively, of a clamping jaw holder according to the invention which is equipped with an anti-theft protection means.

The clamping jaw holder has a body 1 which is configured as a housing for accommodating the actuating mechanism, the front wall of which body forms a bearing surface 2 for a smartphone or tablet and on the lower region of which body a stationary jaw 3 is arranged. A movable jaw 4 is arranged at the top on the body 1.

Figure 3:
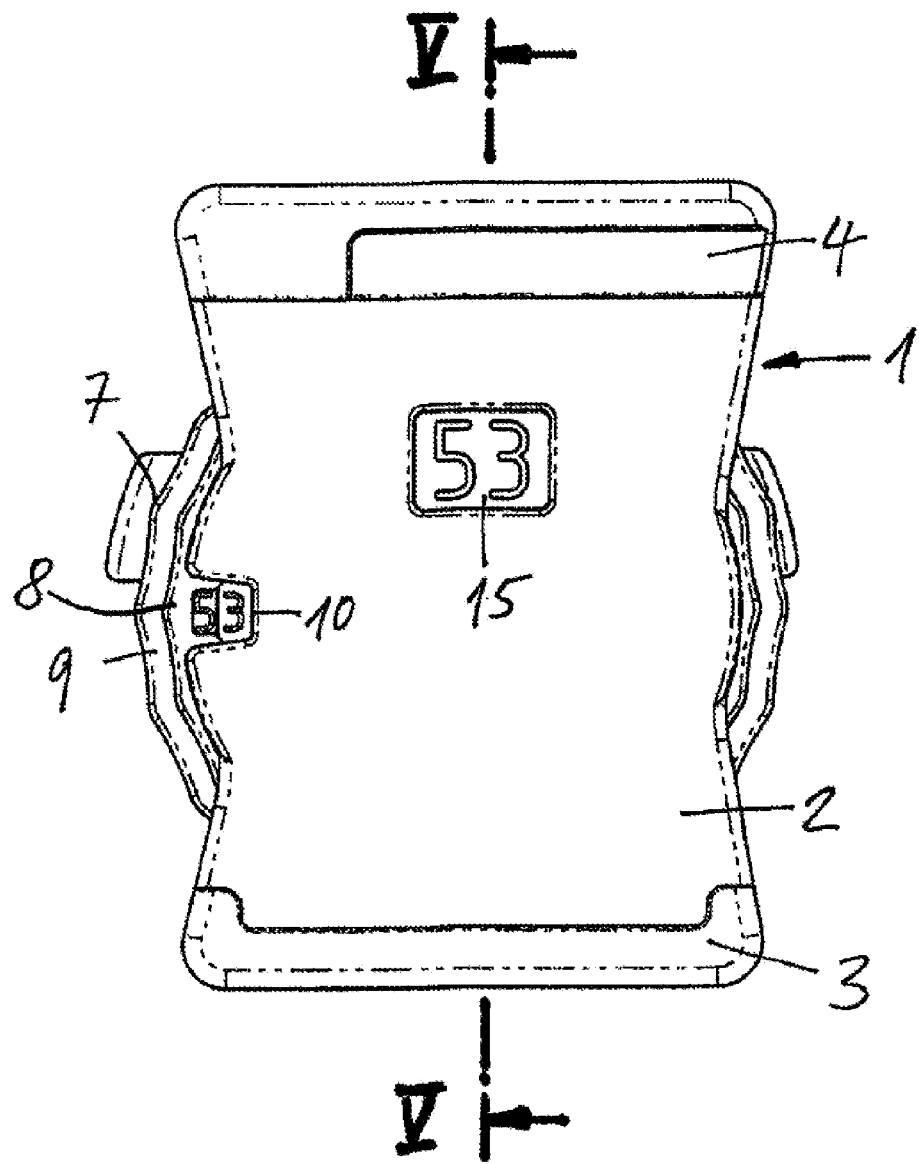
FIG. 3 shows a front view of the holder with closed jaws.
Figure 4:
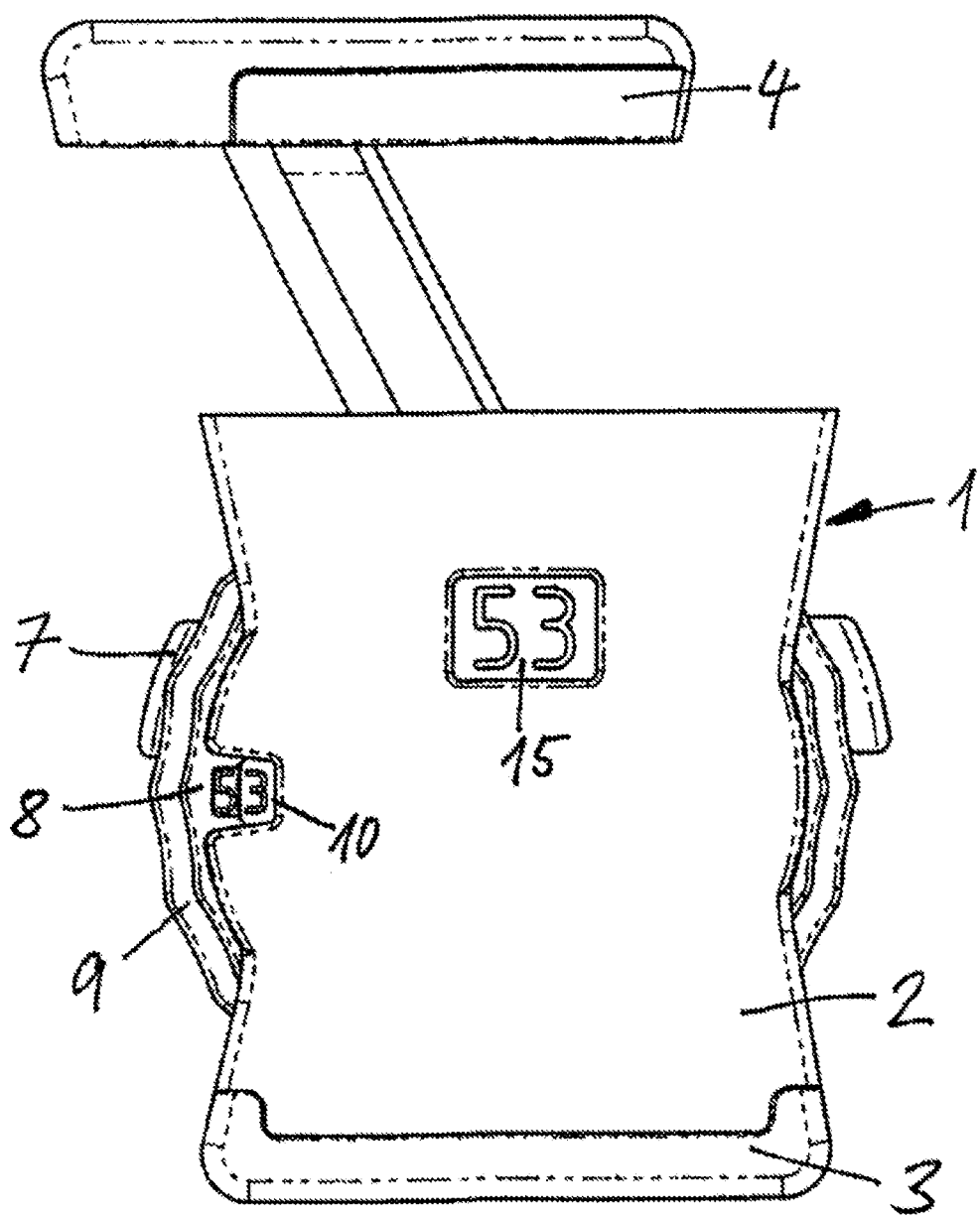
FIG. 4 shows a front view of the holder with open jaws.

FIGS. 1 and 2 and FIG. 3, which shows a front view of the holder, each show the holder in the closed state, that is to say with the upper jaw 4 completely retracted. FIG. 4, which likewise shows a front view of the holder, shows the holder with the upper jaw 4 fully extended.

Figure 5:
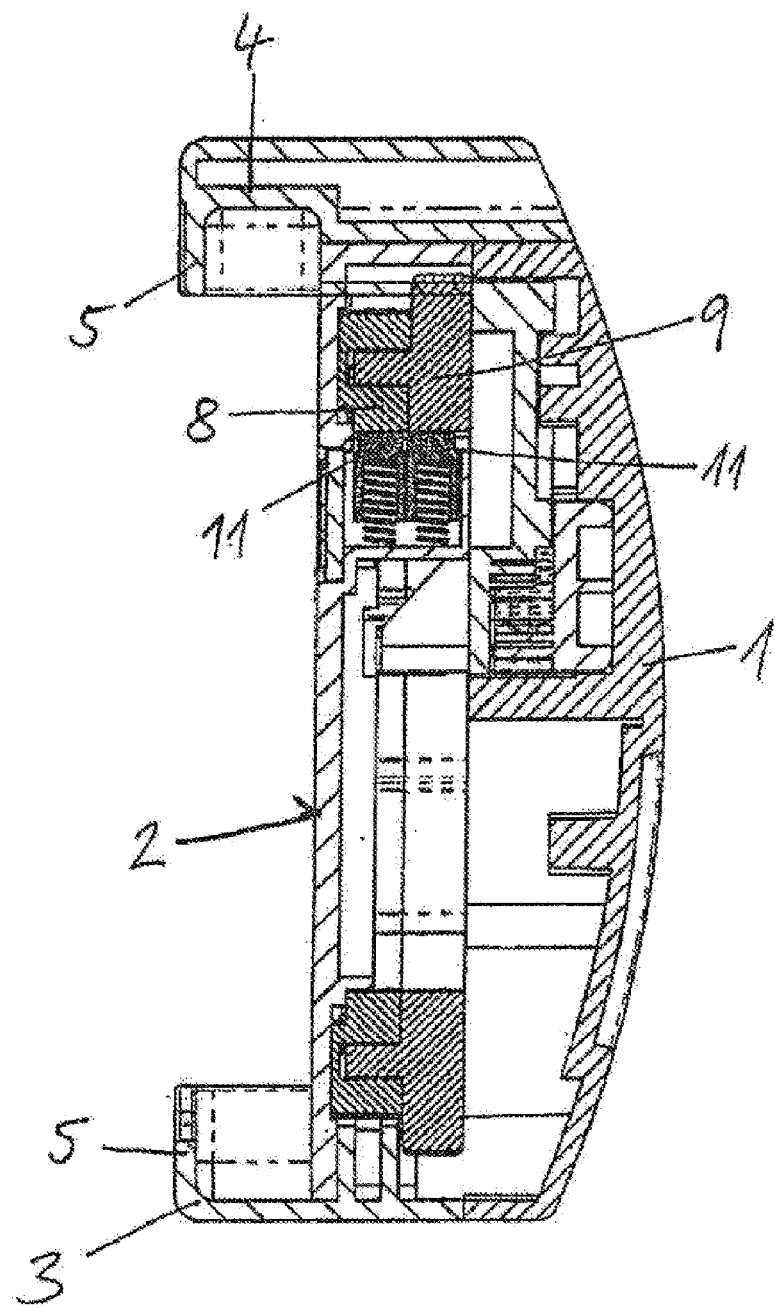
FIG. 5 shows a section through the holder along the section line V-V in FIG. 3.

As can already be seen from the perspective views of FIGS. 1 and 2, particularly in the case of the lower jaw 3, and very clearly in the sectional view of FIG. 5, both the lower jaw 3 and the upper jaw 4 are in each case of recess-like configuration, in order to accommodate the lower edge region and the upper edge region of the smartphone or tablet, and have lateral and front edge strips 5 which are pulled inward, so that when a smartphone or tablet is inserted they engage, together with the bearing surface 2, on all sides around the upper and lower region of said smartphone or tablet and thus make it impossible to remove the smartphone or tablet from the holder when the holder is closed.

As can be seen in FIG. 2, the body 1 can be provided with a connection 6 which is configured, in the exemplary embodiment, as a depression for the form-fitting accommodation of a mating element and with screw holes, in order to be able to mount the clamping jaw holder on a support device, for example on a shopping cart.

The actuating mechanism accommodated in the body 1 of the clamping jaw holder comprises a conventional actuating mechanism for the movable upper jaw 4, which preloads the upper jaw 4 into the open position thereof, illustrated in FIG. 4, in a resilient manner and makes it possible to close the upper jaw 4, counter to the spring preload, by way of a ratchet mechanism, until it bears against an inserted smartphone or tablet, and to hold it in the respective closed position, and which can be unlocked by means of a release button 7 configured as a locking slide, in order to allow the upper jaw 4 to return to the extended position thereof. In this respect, the actuating mechanism corresponds to the prior art and requires no further description.

In the case of the clamping jaw holder according to the invention, the actuating mechanism also comprises a combination locking mechanism which will be described in more detail below in particular with reference to FIGS. 5 to 7. FIG. 5 shows a section along the section line V-V in FIG. 3, and FIGS. 6 and 7 each show a cut-open front view of the holder without the front wall which forms the bearing surface 2 and without the front adjusting wheel 8, so that only the rear adjusting wheel 9 and the interaction thereof with the locking slide 7 is visible.

The combination locking mechanism follows the general principle of conventional combination locks and has, in the illustrated exemplary embodiment, two disk-shaped adjusting wheels 8 and 9, namely a front adjusting wheel 8 and a rear adjusting wheel 9, which are arranged in succession and concentrically and of which the front adjusting wheel 8 has a somewhat smaller diameter than the rear adjusting wheel 9, so that a staggered arrangement of the diameters is produced, which, from the front side of the holder, makes the two adjusting wheels 8 and 9 clearly visible and in each case makes them separately actuable. Both adjusting wheels 8 and 9 have an edge profiled with grip recesses, as is visible from FIGS. 1 to 4, in order to be able to grip the adjusting wheels easily with the fingers. Both adjusting wheels 8 and 9 protrude to some extent, on both sides, beyond the body 1 or at least the bearing surface 2, in order to be able to grip them easily. The rear adjusting wheel 9 also engages with an integrally formed front ring into a corresponding groove of the front adjusting wheel 8, so that the two adjusting wheels 8 and 9 are centered relative to one another.

The two adjusting wheels 8 and 9 each have a number of defined rotary positions which are each provided with a designation which is arranged on the front of the respective adjusting wheel and is visible to the user. In the present exemplary embodiment, there are ten positions, with designations formed by the numerals 0 to 9, for each adjusting wheel. Said designations are visible alongside each other in a window 10 of the bearing surface 2, which window is configured as a lateral notch. In the window 10, the respective setting positions of the two adjusting wheels 8 and 9 are visible alongside each other, here the position "5" of the one adjusting wheel and the position "3" of the other adjusting wheel, that is to say the setting combination "53". The respective setting positions are in each case defined by a latching body 11, which is visible in the section according to FIG. 5, which is assigned to each adjusting wheel 8 and 9 and which is preloaded in a resilient manner against the inner circumference thereof, and latching openings 12 configured as notches, which are arranged on the inner circumference of each adjusting wheel, which are visible in FIGS. 6 and 7 and into which the latching body 11 latches in the respectively set position.

As is visible from FIGS. 6 and 7, the two adjusting wheels 8 and 9 also have, on their inner circumference, a respective key opening 13 into which a key nose 14 of the locking slide 7 can engage if the respective adjusting wheel is located in that rotary position which makes it possible to open the movable jaw 4. FIG. 6 shows the mechanism with locking slide located in the locking position, but already in that position of the rear adjusting wheel 9 which makes actuation of the locking slide 7 into the release position possible, where the key opening 13 and the key nose 14 are flush with one another. FIG. 7 shows a mechanism with locking slide 7 shifted into the release position, where the key nose 14 dips into the key opening 13 and the movable jaw 4 (still illustrated in the closed state) can extend into the open position.

In the illustrated exemplary embodiment, for the sake of simplicity, ten possible rotary positions, with the designations in each case by way of the numerals 0 to 9, are provided for each adjusting wheel 8 and 9. This gives rise to one hundred possible settable combinations in the case of two adjusting wheels 8 and 9. It goes without saying that, in a variation from the illustrated exemplary embodiment, other numbers of possible rotary positions for each adjusting wheel are also possible, in particular also numbers greater than ten, and letters can also be used as designation of the respective rotary positions. Greater numbers of settable rotary positions for each adjusting wheel present themselves if the diameter and thus the circumference of each adjusting wheel is large enough therefor, and the greater the number of settable rotary positions for each adjusting wheel is, the greater the number of resulting possible setting combinations. In this case, the numbers of settable rotary positions in the case of the two adjusting wheels can also be of different magnitude. Furthermore, it is of course also possible to use a third adjusting wheel and as a result significantly increase the number of possible combinations; however, this requires a correspondingly large structural depth of the body 1.

In principle, the use of only one adjusting wheel is also possible, with it however being possible to realize only a correspondingly small number of setting possibilities. Instead of adjusting wheels, other adjusting members with identical function could also be used.

DETAILED DESCRIPTION

In order to be able to produce holders with a respective specific combination from the available number of possible combinations, it suffices, in the case of adjusting wheels 8 and 9 which are each manufactured in identical fashion, to apply only the ring of the combination designations to be applied, relative to the key opening, in different rotary positions and, in the exemplary embodiment, set up different combinations from the possible ten different front adjusting wheels 8 and the ten different rear adjusting wheels 9. The combination which is valid for each holder can, as illustrated in the drawings, be arranged on the bearing surface 2 in the form of a marking 15 which is visible to the user but which, with a placed-on smartphone or tablet, is hidden and thus not visible to others. After the smartphone or tablet has been placed on and the movable jaw 4 has been closed, the adjusting wheels 8 and 9 are rotated so that the holder, with jaws closed, is locked and the smartphone or tablet accommodated therein is protected against theft.

In a preferred embodiment, the holder is arranged on a transport cart which can be moved by hand. For this purpose, a corresponding adapter 20, 30 is used, which ensures a form-fitting, long-lasting and preferably changeable connection between the holder and a component of the transport cart.

It has proven to be advantageous to attach the holder to a hand grip of the transport cart by means of adapters 20, 30. Said hand grip can in this case be embodied as a round tube. As an alternative, in the case of such transport carts, a grip is used which is additionally equipped with a so-called coin deposit system 40. In this case, an arrangement on one of the corners 42 of said coin deposit system 40 is advantageous. The adapter 20, 30 is embodied accordingly for the respective use.

Figure 8:
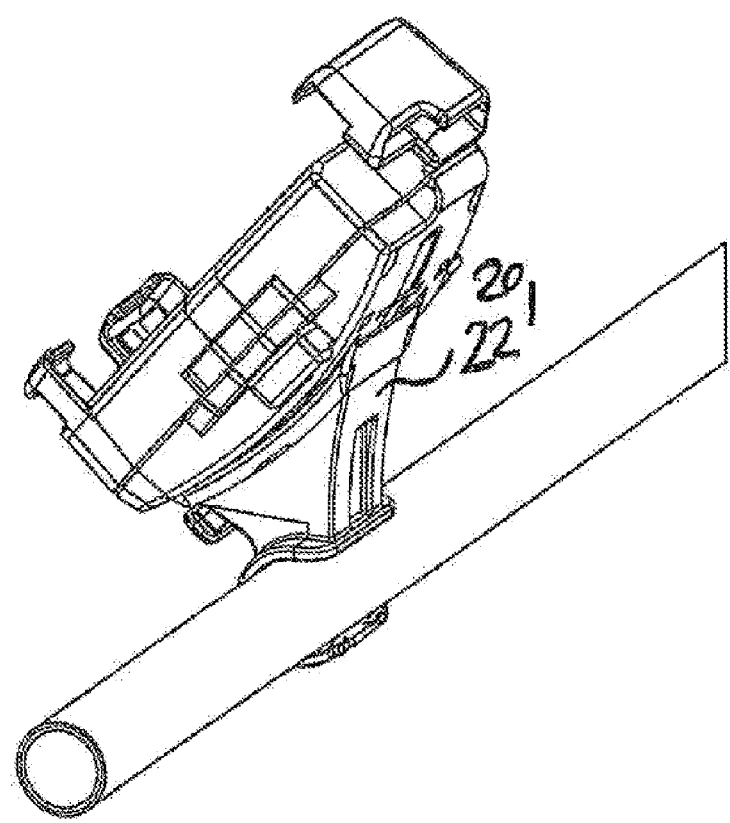
FIG. 8 shows a holder arranged, by means of an adapter, on a round tube grip of a transport cart.

FIG. 8 shows a holder which is arranged on a round tube grip of a transport cart (not illustrated) by means of an adapter 20. The adapter 20 is arranged on the rear side of the holder. It is arranged so as to be inclined in the direction of the person pushing a transport cart. The adapter 20 is embodied accordingly for this purpose.

Figure 9:
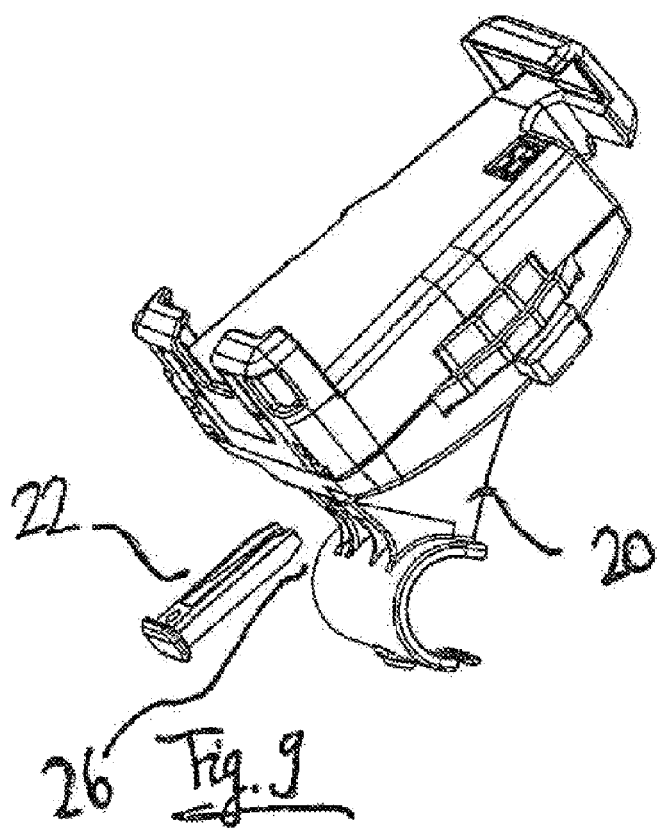
FIGS. 9, 10, 11 show various illustrations of the holder with adapter.
Figure 10:
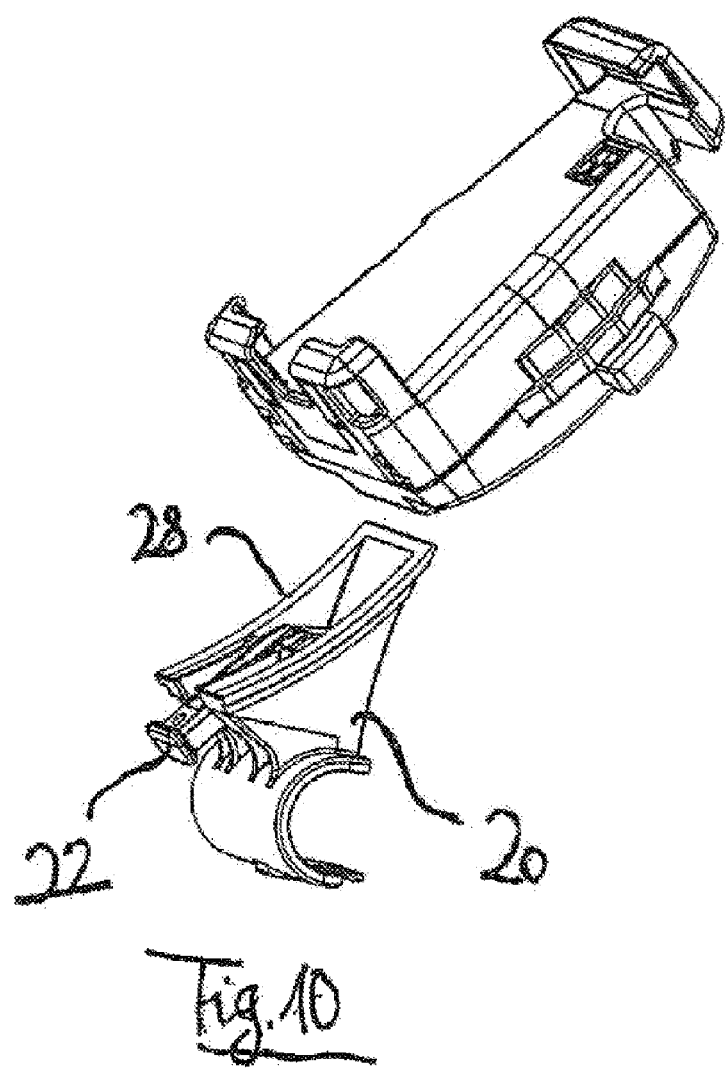

The adapter 20 is preferably connected to the holder in a changeable or positionally fixed manner by means of an additional pin 22. FIG. 9 shows such a pin 22. This engages in the adapter 20 in a form-fitting manner, as is illustrated in FIG. 10. The pin 22 can preferably be unlocked and removed by means of a special key (not illustrated in any more detail). For this purpose, the pin 22 can be embodied as illustrated. The front part of the pin 22, in the front region, is preferably split in two. The length of the pin 22 can accordingly be embodied so as to correspond to the surface present on the rear side of the holder. The region in which the pin 22 is accommodated can and should be kept very small. The opening for accommodating the pin 22 is preferably provided in the downwardly directed region 26 of the adapter 20.

Figure 11:
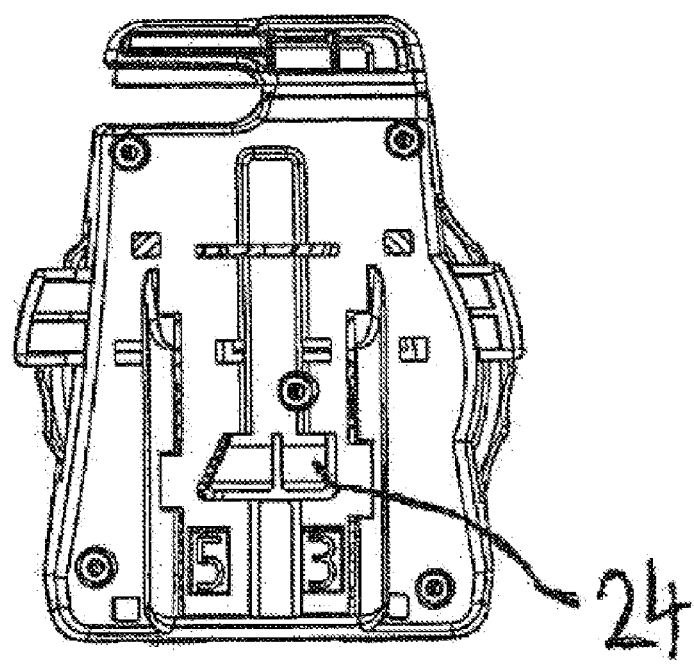

The rear side of the holder has a locking element 24 which ensures a long-lasting connection between the holder and the adapter 20. The locking element 24 can be embodied, for example, in the form of a barb, as shown in FIG. 11. The locking element 24 can be released by applying pressure, for example. A simple exchange of a damaged holder is possible as a result.

The pin 22 is preferably produced from a plastic; other materials are also conceivable. The adapter 20 has a C-shaped receptacle 21 for the attachment to a round tube grip. Furthermore, the adapter 20 is attached to the rear side of the holder in a form-fitting manner. For this purpose, a U-shaped web 28 is provided, which is embodied to be open in the direction of the receiving region of the pin 22. Further securing means can be introduced if necessary.

Figure 12:
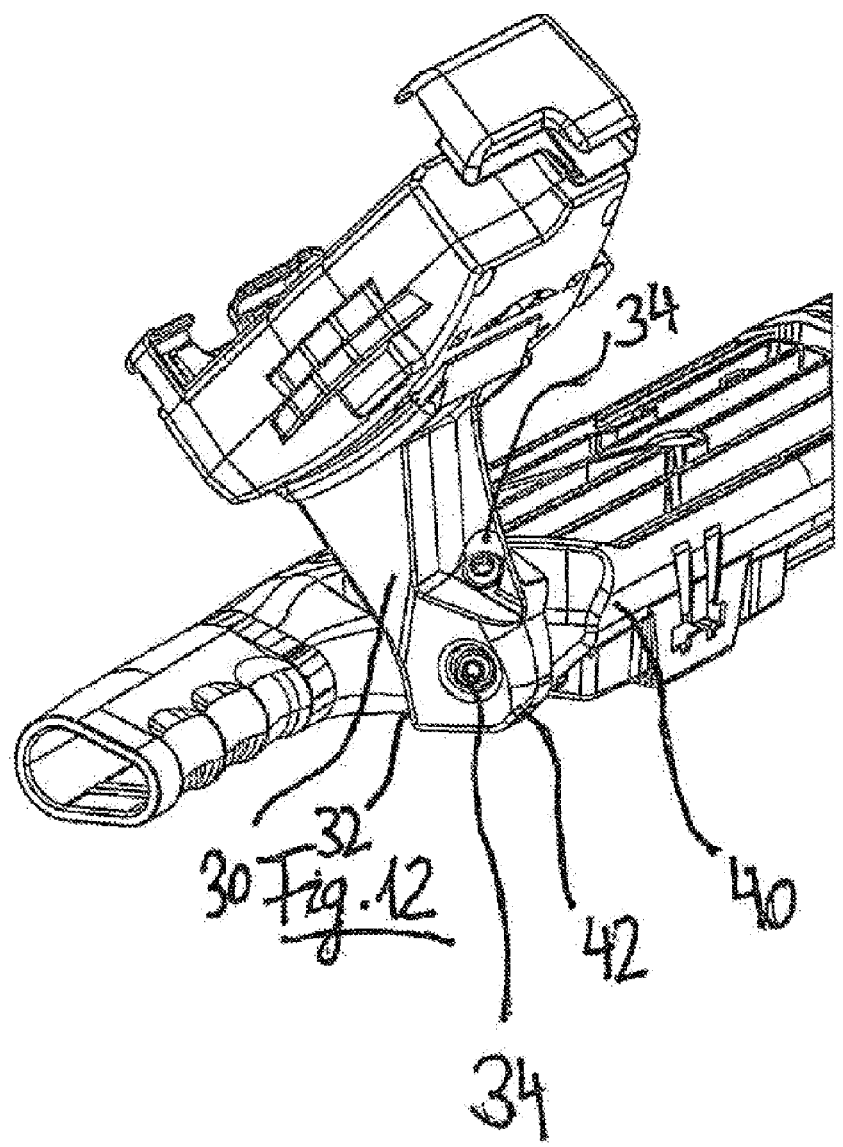
FIG. 12 shows a holder arranged, by means of a further adapter, on a coin deposit system of a transport cart.

As illustrated in FIG. 12, a holder can be arranged on a coin deposit system 40 of a transport cart (not illustrated) by means of a similarly embodied adapter 30. For this purpose, an elongate embodiment of the adapter 30 may prove to be expedient. The coin deposit system 40 provides sufficient space for accommodating an adapter 30. In this case, too, a position of the holder that is inclined toward the person pushing a transport cart makes sense. This positioning can ensure a comfortable grip. In this embodiment, a secure arrangement of the adapter 30 on the holder, as already described, is likewise selected. However, the adapter 30 differs in terms of the region for the arrangement 32 of the adapter 30 on the coin deposit system 40. In this case, a form-fitting arrangement of the adapter 30 is provided in accordance with the coin deposit system 40 used. An additional, long-lasting and changeable arrangement is to be ensured. The use of additional securing means 34 therefore makes sense.

Further embodiments of an adapter are conceivable.

It has proven to be expedient to provide the set number combination on the rear side of the holder, for example in the region, or beneath the arrangement region, of the adapter 20, 30. If the number combination has been forgotten, it can be found out in a simple manner.

Figure 13:
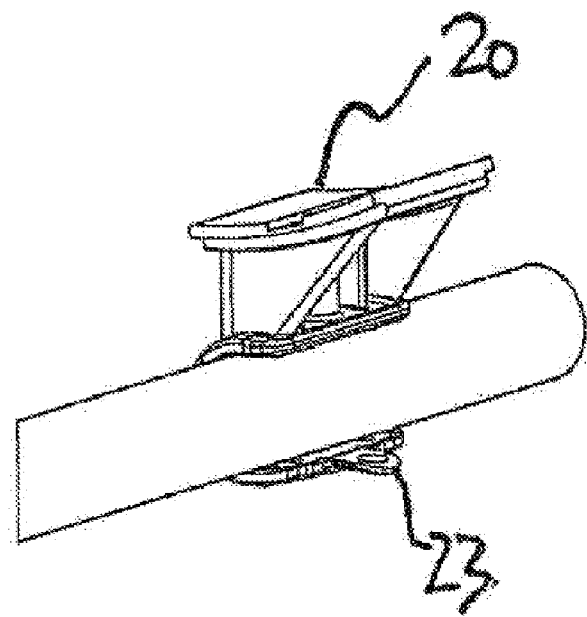
FIGS. 13, 14 show the first adapter with an arrangement aid.
Figure 14:
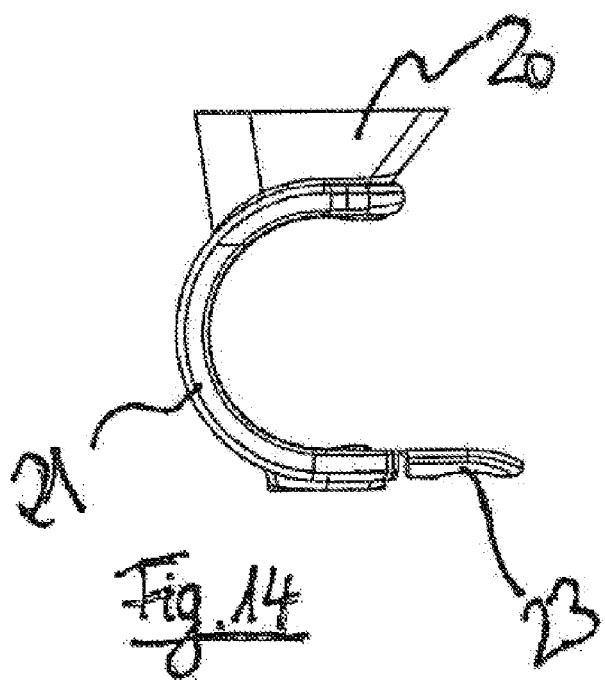
Figure 15:
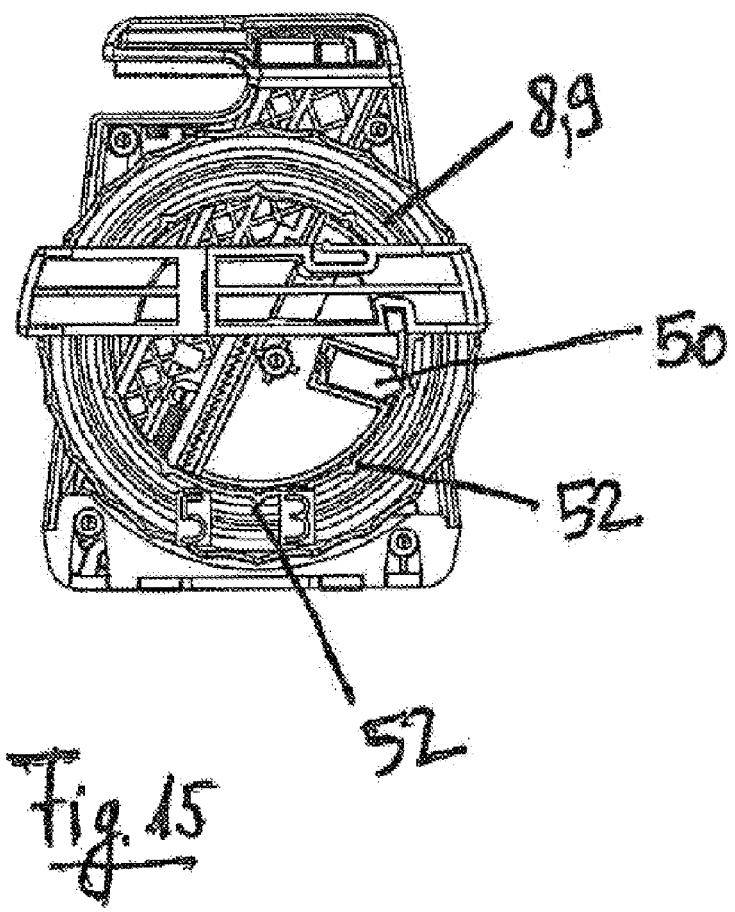
FIGS. 15, 16 show a holder with an additional spring element.
Figure 16:
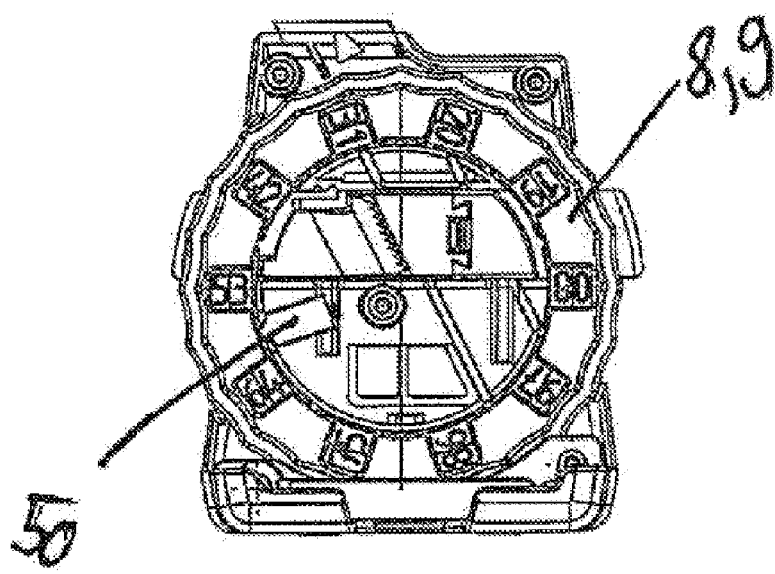

As illustrated in FIGS. 13 and 14, an arrangement aid 23 can be integrally formed as an extension of the C-shaped receptacle 21. Said arrangement aid can be embodied in the form of a removable film hinge which, if it does not need to be used, can be removed, in particular can be cut or torn off in a simple manner. The arrangement aid 23 permits an improved arrangement on a round tube of a transport cart, in particular in the case of different sizes of the cross section. A bore is typically provided for accommodating the adapter 20 on the round tube, said bore being able to accommodate a fixing element, such as, for example, a screw or a dowel, for fastening purposes. Depending on how such a bore is created, this can result in a slight change of the cross section. The arrangement aid 23 can compensate for this in a simple manner.

The marking 15 is preferably embodied as a double-digit number. Furthermore, numbers with further digits or another marking 15 are conceivable. It has proven to be expedient to produce the bearing surface 2 from a plastic in an injection-molding method. Furthermore, in order to be able to use a mold, independently of the marking 15, in a particularly advantageous version the region of the marking 15 is provided without a marking 15 in the manufacturing process. The marking 15, in particular a multi-digit number in the present case, is applied, engraved or otherwise attached subsequently. The use of laser engraving has proven to be particularly advantageous. In the case of the arrangement of a marking on the rear side of the mount, as already described, said marking can likewise be applied, engraved or otherwise attached subsequently.

In order to compensate for inaccuracies during the setting of the adjusting elements 8, 9, which can lead to the holder no longer being able to be opened, it has proven to be expedient to use an additional spring element 50. This can for example be formed of a block which is loaded with a spring force. Said block latches in cutouts 52, by means of which the position of the adjusting element 8, 9 can be unambiguously assigned. The spring-loaded block latches at a defined angle. In this case, an acoustic signal, for example a clicking, can also occur. The user can thus independently and simply determine that the adjusting element 8, 9 has been set correctly.

As can be seen from FIG. 9, the holder has a notch in the region of the upper jaw 4. This ensures that the camera of a smartphone is not covered. Damage can thus be avoided.

The jaws 3, 4 can be embodied as one part or in multiple parts. As can be seen in FIG. 9, a two-part embodiment has proven to be expedient for jaw 3. The two parts are in each case arranged in the corner. By contrast, the jaw 4 has a one-part embodiment.

The jaw 4 is preloaded by way of a spring; in this way the smartphone or tablet is always enclosed in a secure manner. In the unlocked state, the jaw 4 therefore moves back into the original position again. An "incorrect" setting of the holder is ruled out.

The release button 7 preferably has a two-color embodiment, for example red and green. In this way, it is possible to visually indicate when the holder is locked or unlocked.

The actual holder has a color different than the release button 7. The release button 7 can be produced in one part by means of a two-component injection-molding process. As an alternative, the release button 7 has a two-part embodiment. The two parts are then assembled in a form-fitting manner.

The marking 15 or the region provided therefor can be embodied with the same color as the setting combination shown in the window 10.

LIST OF REFERENCE SIGNS

1 Body
2 Bearing surface
3 Stationary jaw
4 Movable jaw
5 Edge strip
6 Connection
7 Release button, locking slide
8 Front adjusting wheel, adjusting element
9 Rear adjusting wheel, adjusting element
10 Window
11 Latching body
12 Latching opening
13 Key opening, key element
14 Key nose, key element
15 Marking
20 Adapter
21 C-shaped receptacle
22 Pin
23 Arrangement aid
24 Locking element
26 Downwardly directed region
28 U-shaped web
30 Further adapter
32 Region for the arrangement
34 Securing means
40 Coin deposit system
42 Rear corner
50 Additional spring element
52 Cutout

The invention claimed is:

1. A clamping jaw holder for smartphones or tablets, comprising:
  a body which forms a bearing surface for the smartphone or tablet and which accommodates an actuating mechanism;
  two jaws which grip the smartphone or tablet on two opposing edge regions and of which at least one jaw of the two jaws is movable between an open position and a variable closed position and can be locked in the closed position, and having a release button for unlocking the locking of the at least one jaw in the closed position thereof, the two jaws configured with edge elements which engage over a respective edge region of the smartphone or tablet in order to accommodate the respective edge region in a form-fitting manner; and
  at least one adjusting element configured to be adjusted between a plurality of defined positions provided with markings and configured with a key element which can interact with a complementary key element of the release button only in one specific position of a plurality of settable positions, in order to make an actuation of the release button into a release position thereof possible only in said specific position and to block the actuation thereof in all other positions;
  wherein the at least one adjusting element comprises at least two adjusting elements; and
  wherein the at least two adjusting elements are formed by adjusting wheels which are arranged concentrically and axially in succession and which protrude from the body on at least one side thereof.

2. The clamping jaw holder as claimed in claim 1, wherein the at least one adjusting element is configured as an adjusting wheel which protrudes from the body on at least one side thereof.

3. The clamping jaw holder as claimed in claim 1, wherein, of the adjusting wheels of the at least two adjusting elements, a rear adjusting wheel has a somewhat larger diameter than a front adjusting wheel.

4. The clamping jaw holder as claimed in claim 3, wherein the key element is positioned on an inner circumference of at least one adjusting wheel of the adjusting wheels, forming a key opening into which a key nose which is connected to the release button can dip.

5. The clamping jaw holder as claimed in claim 1, further comprising an adapter having a changeable connection between the holder and a component of a transport cart.

6. The clamping jaw holder as claimed in claim 5, wherein the holder is attached to a hand grip of the transport cart by the adapter.

7. The clamping jaw holder as claimed in claim 5, wherein the adapter is connected to the holder via a pin.

8. The clamping jaw holder as claimed in claim 5, wherein the adapter is arranged on a coin deposit system of the transport cart and a form-fitting arrangement of the adapter is provided for this purpose.

9. The clamping jaw holder as claimed in claim 1, wherein a valid number combination is arranged on the bearing surface in the form of a marking of the markings.

10. The clamping jaw holder as claimed in claim 1, wherein a set number combination is provided on a rear side of the holder.

11. The clamping jaw holder as claimed in claim 1, wherein the at least one jaw is movable diagonally.

12. A transport cart having a holder as claimed in claim 1.

* * * * *